No. 792,723. PATENTED JUNE 20, 1905.
G. G. McKAY.
MACHINE FOR CUTTING EXPANDED METAL.
APPLICATION FILED MAR. 4, 1904.
5 SHEETS—SHEET 1.
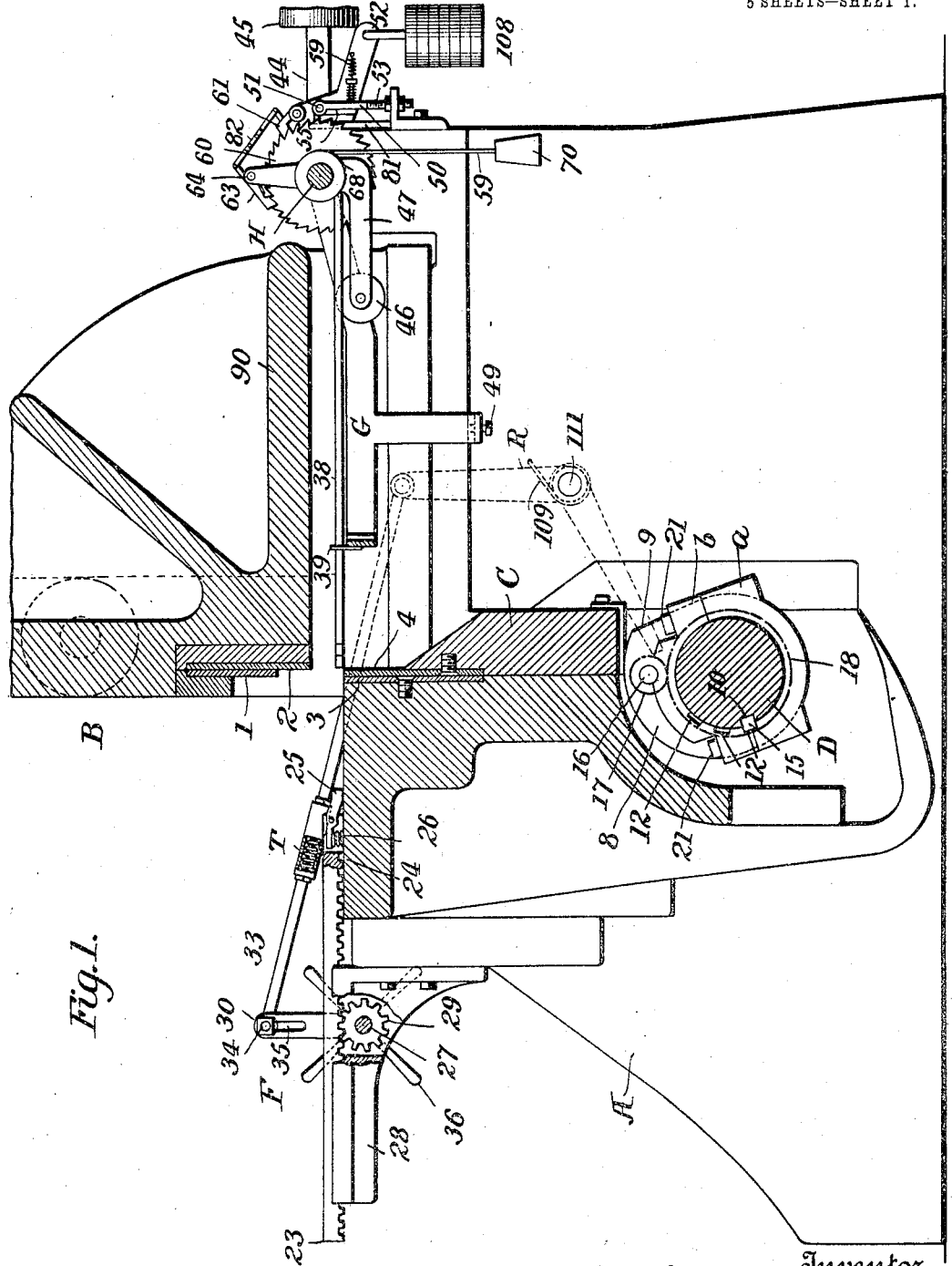
Witnesses
Inventor
George G. McKay
Attorneys

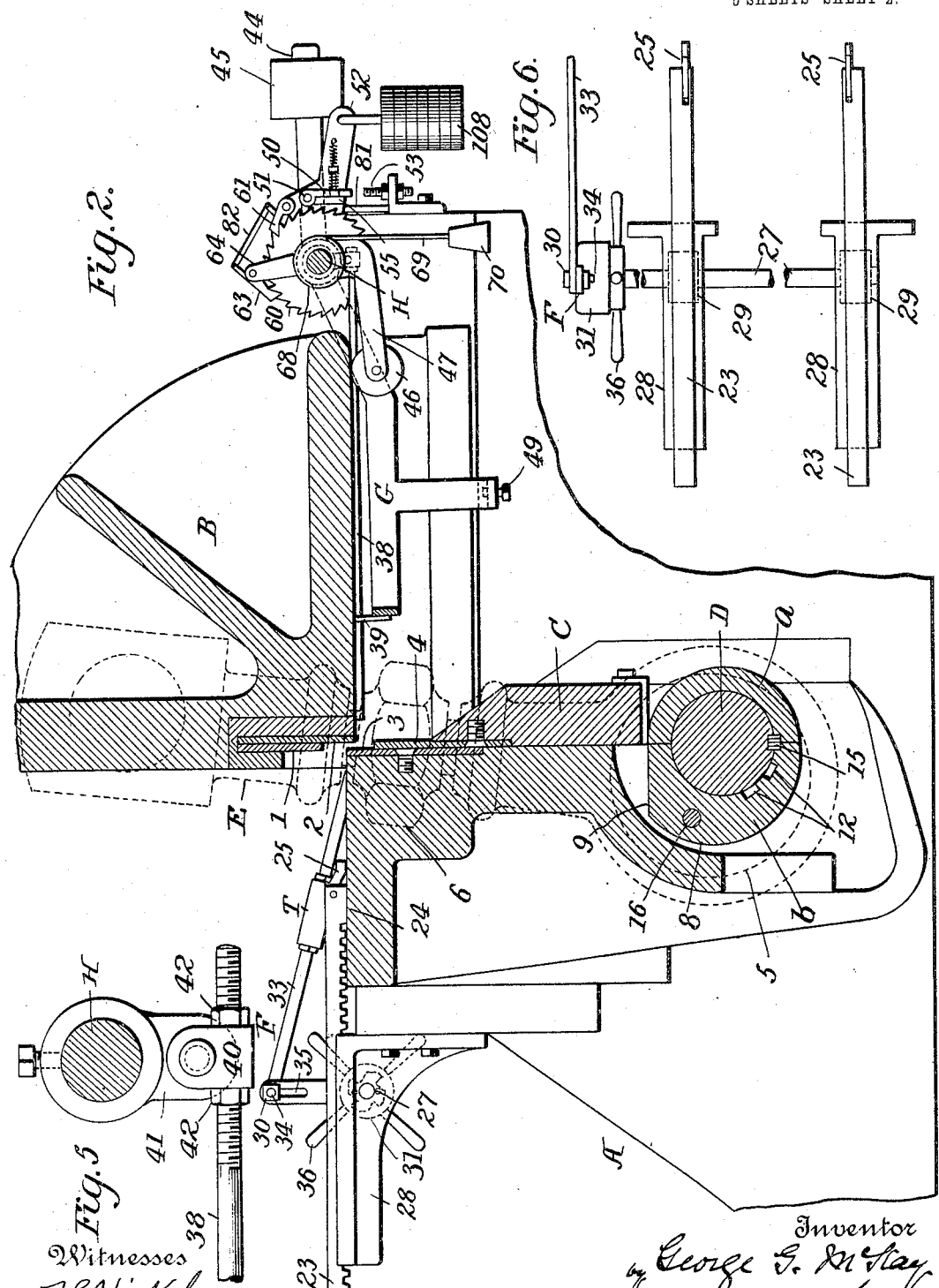

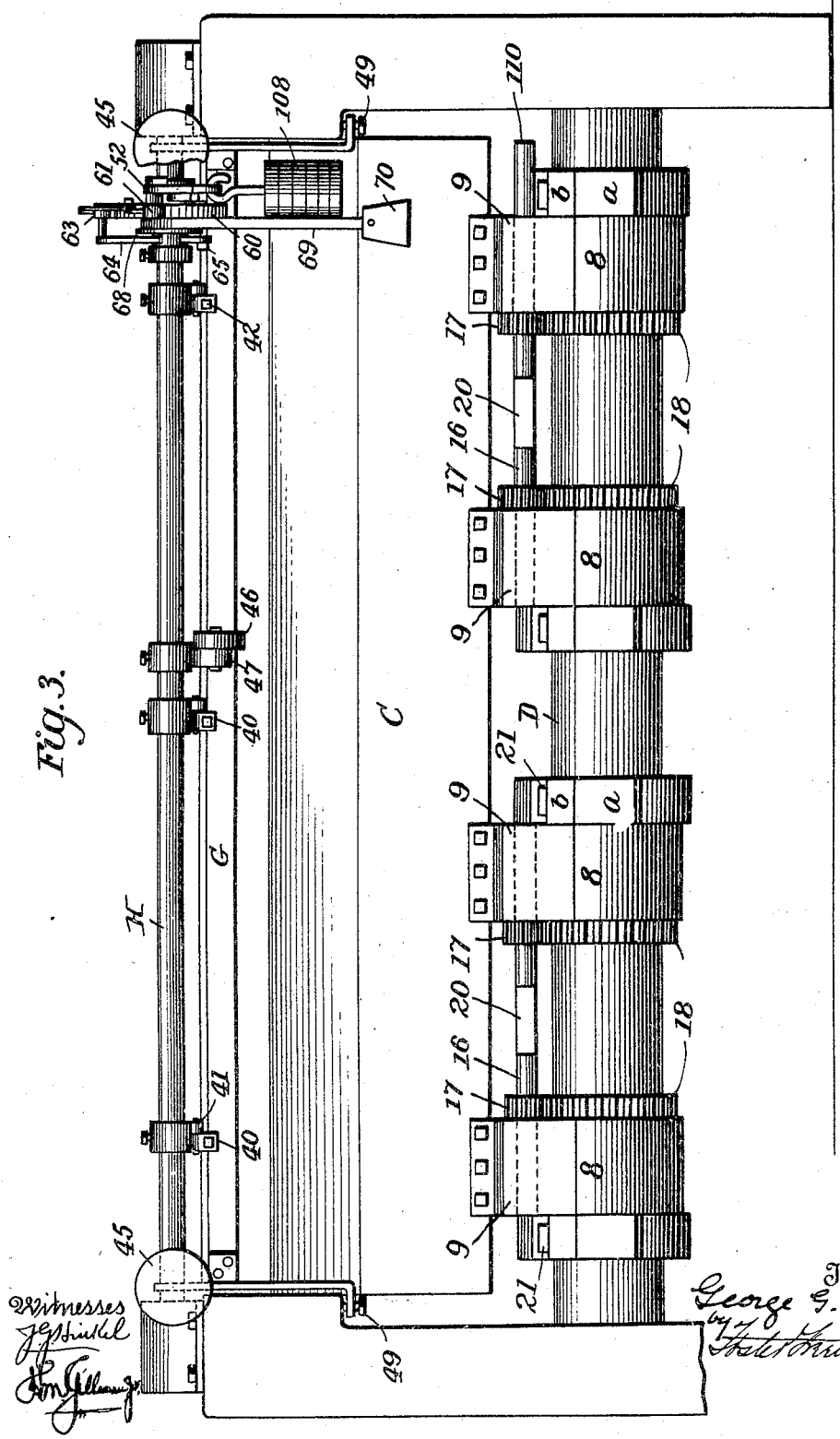

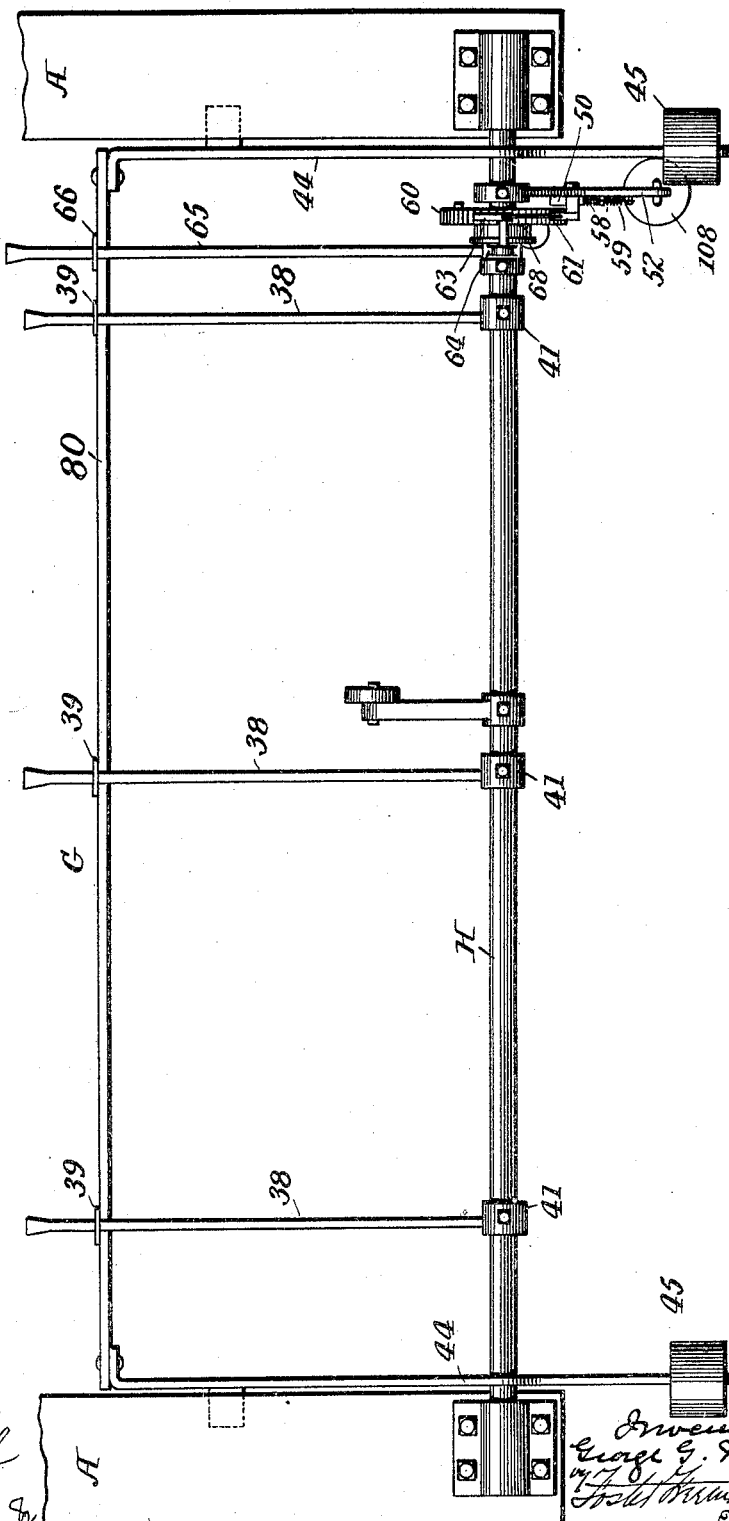

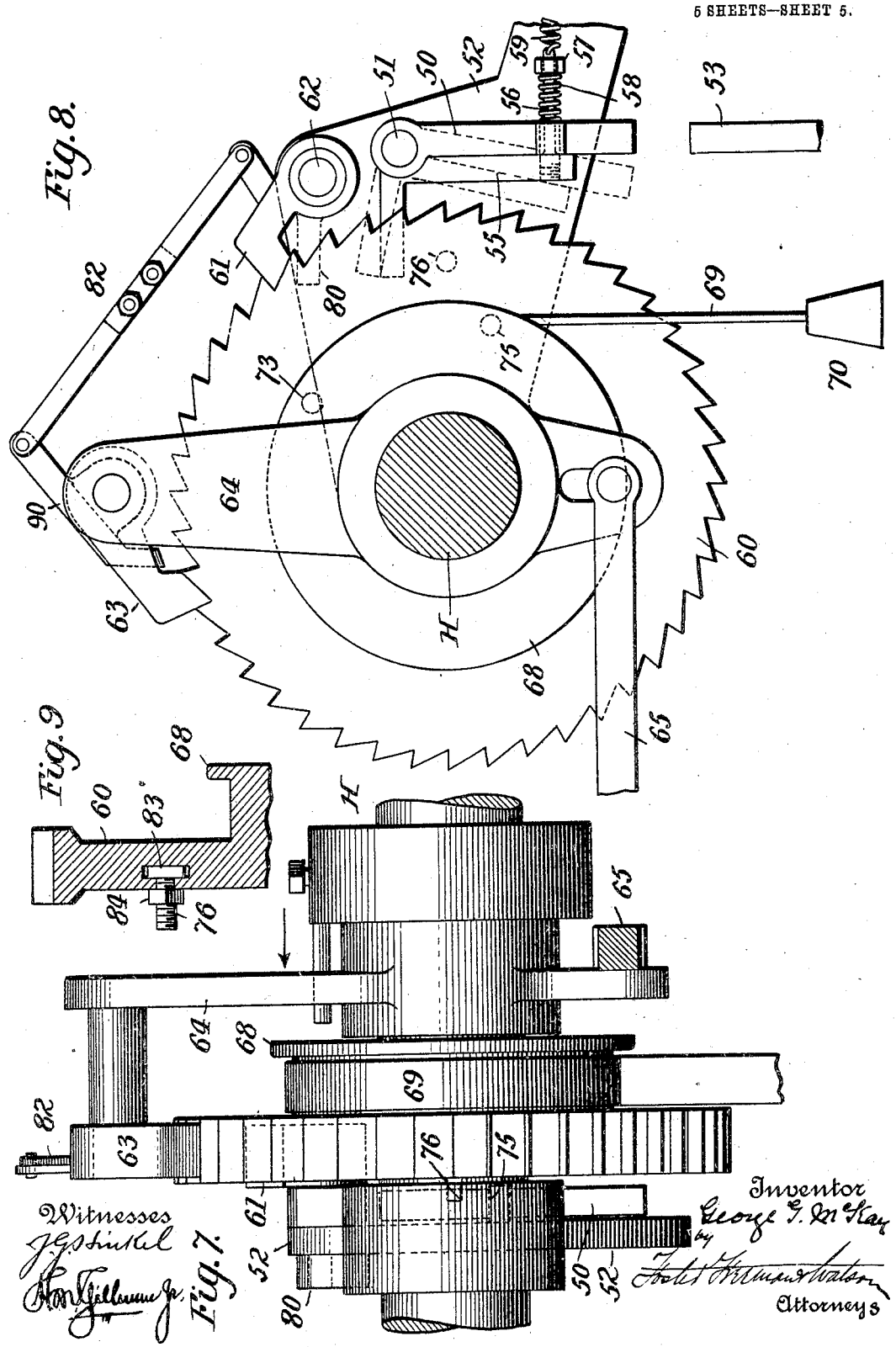

No. 792,723.

Patented June 20, 1905.

UNITED STATES PATENT OFFICE.

GEORGE G. McKAY, OF YOUNGSTOWN, OHIO, ASSIGNOR TO THE YOUNGSTOWN IRON & STEEL ROOFING COMPANY, OF YOUNGSTOWN, OHIO, A CORPORATION OF OHIO.

MACHINE FOR CUTTING EXPANDED METAL.

SPECIFICATION forming part of Letters Patent No. 792,723, dated June 20, 1905.

Application filed March 4, 1904. Serial No. 196,511.

*To all whom it may concern:*

Be it known that I, GEORGE G. McKAY, a citizen of the United States, residing at Youngstown, in the county of Mahoning and State of Ohio, have invented certain new and useful Improvements in Machines for Cutting Expanded Metal, of which the following is a specification.

My invention relates to that class of machines in which cutters suitably arranged and operated slit a sheet of metal and expand the slitted portion, forming what is termed "expanded metal;" and my invention consists in certain details of construction of the machine having for their object to properly regulate the movement of the parts, feed and gage the sheet to be cut, and sever the same when required, as fully set forth hereinafter and as illustrated in the accompanying drawings, in which—

Figure 1 is a sectional elevation of sufficient of an expanded-metal-making machine to illustrate my invention; Fig. 2, the same, showing the parts in a different position; Fig. 3, a rear elevation of the parts shown in Fig. 1 except the upper cutter-head; Fig. 4, a plan of the gage-frame and adjuncts; Fig. 5, a detached detail; Fig. 6, a plan of the feeder; Fig. 7, an enlarged elevation of the control device and adjuncts; Fig. 8, a side view of the parts shown in Fig. 7 looking in the direction of the arrow; Fig. 9, a detached cross-section of part of the controller-wheel.

The frame A has guides for a vertically-reciprocating head B, and the latter carries two series of knives or cutters 1 2, having V-shaped edges arranged alternately, the cutters 2 below the cutters 1, and the latter shear against a stationary straight-edged knife 3, carried by the frame A, while the knives 2 shear against a straight-edged knife 4, carried by a drop-bar C. The reciprocating motion is imparted to the head B from a cam 5 on a shaft D through the medium of an extensible connecting-rod E, having two sections which may be carried to or from each other by means of a reversely-threaded rod 6.

All of the above parts are such as have been heretofore employed and are well known in this class of machinery and need not be further described. In the ordinary operation of these parts on the descent of the head B the knives 2 first shear with the knife 4 and when one half the strands of a mesh have been cut and expanded the knife 4 descends as the other half of the strands of the mesh are cut and expanded, so that each line of meshes is completed by one descent of the cutter-head. It is obvious that in cutting meshes of different sizes the time of dropping the bar C must be varied—that is, the said bar must be dropped later in the operation of the machine if large knives making a deep mesh are used than when the knives are small and expand the mesh to a less extent. To permit this variation, I impart the vertical reciprocation to the drop-bar C through the medium of cams or eccentrics 8 on the shaft D, which, by contact with the bar, lift it and then allow it to drop somewhat quickly as the heels 9 of the cams pass from below the bar, and to vary the time of this action I so set the cams adjustably upon the shaft D that they may be advanced or moved backward thereon. Any suitable means may be employed for this purpose, but, as shown, there is a keyway 10 in the shaft D and a number of slots 12 in the hub of each cam, and the cam may be set and secured in different positions by bringing either slot 12 opposite the keyway and then inserting a key 15. In order to facilitate this adjustment of the cams, I extend through two or more of the same a shaft 16, carrying pinions 17, gearing with racks 18 upon the shaft D, the shaft 16 having square or flat faces 20, to which a wrench may be applied, so as to turn the shaft, causing the pinions to travel on the racks, carrying the cams and their supporting cam-rings with them. Preferably each cam-ring is made in two sections *a b*, which may be applied to the shaft and then secured together by bolts 21.

The sheets are fed intermittently to the knives, and this feeding is effected by means of a feeding device F, consisting of two parallel bars 23 23, Figs. 1 and 2, and means for moving them toward the knives over the table 24 upon the frame A. Each bar is provided with a pivoted finger 25, the end of which is pressed toward the table by a spring 26.

The simultaneous movement of the bars is effected from a shaft 27, turning in brackets 28, bolted to the frame, which brackets have guideways for the bars 23, and pinions 29 on the shaft engage racks at the under edges of the bars. The intermittent turning of the shaft 27 is effected from a reciprocating arm 30, having a hub 31 provided with any suitable internal roller-ratchet (not shown) that permits the arm to swing outward without turning the shaft, but rotates it on its inward motion. This arm may be reciprocated from any suitable part of the machine—as, for instance, by means of a connecting-rod 33, extending to a lever R, Fig. 1, pivoted to the frame at 111—and the arm 30 is provided with a pin 34, adjustable in the slot 35 of the arm 30, so that by adjusting the pin 34 the extent of feed at each movement may be varied. The lower end of the lever R is in position to be lifted by a projection 110, Fig. 3, at the side of one of the cams 8, to thereby swing the arm 30 to feed the sheet, the reverse movement being effected by a spring 109 or otherwise. The rod 33 is in two sections, with an intervening spring-box T, which permits the arm R to move if the movement of the sheet is interrupted. The shaft 27 is provided with a hand-wheel 36, by means of which it may be turned to carry the bars forward by hand to proper position for starting.

While the feed device serves to carry the sheet forward approximately to its proper position to be operated upon by the knives, it is necessary to provide a gage for the accurate adjustment and feed of the sheet, with means for holding the gage in position to meet the edge of the sheet and to carry it out of position before cutting. Such gage consists of a series of gage rods or bars 38, sliding in a frame G, carried by a shaft H, rocking in bearings at the rear of the main frame A. As shown, the frame G has guides 39, Fig. 4, mounted on a cross-bar 80 of the frame and through which the bars or rods 38 extend, the rear end of each rod being threaded and passing through a block 40, pivoted to an arm 41 on the shaft H, with set-nuts 42 for holding the rod in place after adjustment. An arm 44, projecting forward at each side from the frame G, carries a weight 45, and the two weights tend to lift the inner end of the frame G and its gage-rods to a position for the rods to meet the edge of the plate, and the descent of the head B, bringing a part 90 thereof into contact with the rods and with a roller 46 upon an arm 47, secured to the shaft, will cause the arm 47 to swing and rock the shaft H, and the frame G will swing downward, the gage-rods being also carried down and drawn back out of position to interfere with the cutting of the sheet. The upward movement of the frame G is regulated by a set-screw 49, carried by an arm of the frame and striking any suitably-arranged stopping-surface. The extent to which the shaft H rocks and carries forward the gage-rods is determined by a dog 50, suspended from a pin 51 on an arm 52, carried by the shaft H, which dog as the inner end of the frame G rises strikes an adjustable stop 53 on the main frame. The arm 52 is carried downward by a weight 108.

It is sometimes desirable to feed into the machine sheets which are longer than the length of expanded mesh required to be produced. For instance, assuming that an expanded sheet of six feet in length can be cut from a solid sheet of a given length, a solid sheet of double the length required to produce six feet of mesh is fed into the machine, and I provide means whereby after one-half the length of the sheet is cut and expanded the cutters will operate to sever the expanded portion from the uncut section of the sheet, after which the latter is operated upon. Different means may be employed for causing the cutters to operate to sever the sheet at any desired interval; but in the construction shown I provide means whereby after a determined number of meshes have been produced to so set the gage-rods 38 that the sheet will not be fed forward sufficiently to produce another line of meshes, so that the knives or cutters will, instead of operating upon the sheet, operate upon the meshes already cut and sever the same. These means I will now describe.

Adjacent to the dog 50 is hung a bell-crank 55, from the lower arm of which a rod 56 extends through an opening in the dog 50 and carries a nut 57, between which and the dog intervenes a spring 58, and a spring 59 extends from the end of the rod 56 backward and is attached to the arm 52. The upper end of the crank 55 extends forward opposite the side of a control device having a ratchet-wheel 60 turning upon the shaft H, and with this ratchet-wheel engages a pawl 61 on a rock-shaft 62, carried by the arm 52, and also a pawl 63, carried by a lever 64, mounted to swing on the shaft H, and from the lower end of the arm 64 a rod 65 extends forward and through a guide 66 on the frame G. At the side of the ratchet-wheel 60 and secured thereto is a band-pulley 68, to a band 69 of which is connected a weight 70. The rod 65, Fig. 4, has its inner end beyond the ends of the gage-rods and at each forward movement of the sheet is thrust backward, rocking the lever 64, the pawl 63 of which, engaging the ratchet 60, moves the latter one step or tooth, the pawl 61 preventing any back movement of the ratchet-wheel under the action of the weight 70. From the side of the ratchet-wheel extends a lug 73, and from the lever 52 extends a lug 75. When the sheet to be expanded is first put in the machine, the lugs 73 75 are in contact, and each movement of the ratchet-wheel 64 carries them apart one step.

Upon the ratchet-wheel 60 is secured an adjustable pin or stop 76, and this is so set that when the proper number of cuts have been made the contact of the pin 76 with the upper arm of the crank 55 will swing the crank and carry the lower end onward to the position shown in dotted lines, Fig. 8, carrying with it the lower end of the dog 50, so that on the next downward movement of the arm 52 the dog 50 instead of striking the stop 53 will escape the latter, and the arm will then descend, so as to carry the gage-rods close to the knife 4, and on the next feed of the sheet it will meet the gage-rods when it has moved only half the usual distance, so that on the descent of the knife the slit and expanded portion will be cut from the sheet.

If the feed of the sheet were invariable, it would be sprung or the parts would be displaced when the gage-rods are set forward, as just set forth. I therefore provide a yielding connection that permits the parts of the feed device to move after the sheet strikes the gage-rods without detrimental strain. Thus I put a spring-box T in the line of the connecting-rod, the spring in which is compressed if the movement of the arm 30 is arrested by the contact of the sheet and the gage-rods, while the movement of the lever E continues.

When the arm 52 drops to its lowest position, an arm 80 on the shaft 62, carrying the pawl 61, is brought in contact with the upper end of a stop-pin 81, Fig. 1, and the shaft 62 is rocked to carry the pawl 61 out of engagement with the ratchet, when the weight 70 will turn the ratchet back to bring the lug 73 into engagement with the lug 75 and carry the stop 76 away from the crank 55, the pawl 63 being lifted simultaneously with the pawl 61 through the medium of the connecting-rod 82 and lifting the lever 90, extending under the pawl 63. On the next upward movement of the arm 52 the parts assume the position previously occupied.

The contact or stop 76 may be adjustably secured to the ratchet-wheel in any suitable way, as shown in Fig. 9. The ratchet-wheel has an annular dovetailed groove 83 receiving the head of a screw-bolt, the threaded shaft of which carries a nut 84 and acts as the stop, the nut 84 serving to secure the bolt after adjustment. It will be seen that the stop 76 may be so set that any predetermined number of cuts may be made before the gage-rod 65 is thrown forward to insure the shearing of the sheet.

As there would be great frictional resistance to the swinging movement of the dog when it is pressed on the stop by the weight 108, I avoid this result by connecting the dog and bell-crank, so that the latter as it swings puts the spring 58 under compression, and when the shaft rocks, carrying the arms 52 slightly upward and removing the dog from the stop, the spring will swing the dog to one side.

Without limiting myself to the precise construction shown, I claim—

1. In a machine for making expanded metal, the combination of the reciprocating cutter-head, its two series of cutters, a stationary cutter, drop-bar and cutter carried thereby, rotating shaft, and cams on said shaft arranged to lift and lower the drop-bar and adjustable to vary the time of dropping the bar, substantially as set forth.

2. In a machine for making expanded metal, the combination of the reciprocating cutter-head, carrying two series of cutters, one extending below the other, a stationary cutter, drop-bar and cutter carried thereby, rotating shaft, and cams on said shaft arranged to lift and lower the drop-bar and adjustable to different positions around the shaft to vary the time of dropping the bar, substantially as set forth.

3. In a machine for making expanded metal, the combination of the reciprocating cutter-head, drop-bar and cutter carried thereby, rotating shaft, cams on said shaft arranged to lift and lower the drop-bar, shafts 16 extending through adjacent cams, pinions on said shafts, and racks on the rotating shaft engaged by said pinions, substantially as set forth.

4. The combination with the cutters of a machine for making expanded metal, of a feed device provided with bars sliding to and from said knives and having racks, a shaft, pinions thereon engaging said racks, a vibrating arm, and devices for turning the shaft when the arm moves in one direction while permitting the shaft to be rotated freely in the opposite direction, substantially as set forth.

5. The combination with the cutters of a machine for making expanded metal and with a bed for supporting sheets of metal, of a feed device provided with bars sliding to and from said knives, means for moving the bars intermittently, fingers jointed to the ends of the bars, and springs pressing the fingers toward the bed, substantially as set forth.

6. The combination with the frame and cutters of a machine for making expanded metal, of a gage consisting of a series of rods, a movable frame carrying said rods, means for sliding the rods on the frame, and means for swinging said frame to carry the rods into and out of position to gage the metal sheet, substantially as set forth.

7. The combination with the frame and cutters of a machine for making expanded metal, of a gage consisting of a series of rods, a movable frame carrying said rods, means for sliding the rods on the frame, means for swinging said frame to carry the rods into and out of position to gage the metal sheet, and means for regulating the extent of the sliding movement of the rods, substantially as set forth.

8. The combination with the frame and cutters of a machine for making expanded metal, of a gage consisting of a series of rods, a movable frame carrying said rods, a rock-shaft having arms to which the rods are connected, and means for rocking the shaft, and for swinging the frame, substantially as set forth.

9. The combination with the frame and cutters of a machine for making expanded metal, of a gage consisting of a series of rods, a movable frame carrying said rods, a rock-shaft having arms to which the rods are adjustably connected, and means for rocking the shaft, and for swinging the frame, substantially as set forth.

10. The combination with the frame and cutters of a machine for making expanded metal, of a gage consisting of a series of rods, a movable frame carrying said rods, a rock-shaft having arms to which the rods are connected, means for rocking the shaft and for swinging the frame, and means for limiting the rocking movement of the shaft, substantially as set forth.

11. The combination with the frame and cutters of a machine for making expanded metal, of a gage consisting of a series of rods, a movable frame carrying said rods, a rock-shaft having arms to which the rods are connected, means for rocking the shaft and for swinging the frame, and means for limiting the rocking movement of the shaft and for varying this movement at intervals to limit the feed of the sheet, substantially as set forth.

12. The combination with the cutters and feed devices of a machine for slitting and expanding and feeding a sheet in making expanded metal, of means for causing the said cutters to shear and divide the sheet after a predetermined number of operations of the cutters, substantially as set forth.

13. The combination with the feed devices and cutters of a machine for making expanded metal, of means for restricting the feed at predetermined intervals to cause the cutters to divide the sheet, substantially as set forth.

14. The combination with the cutters of a machine for making expanded metal, of gages for determining the normal feed of the sheet, and means for limiting this feed when a sheet is to be divided, substantially as set forth.

15. The combination with the cutters of a machine for making expanded metal, of gages for determining the normal feed of the sheet, and means for setting the same mechanically to reduce the normal feed of the sheet when the latter is to be divided, substantially as set forth.

16. The combination with the cutters and gages of a machine for making expanded metal, of means for carrying the gages into and out of position, a dog limiting the action of said means, and a control device and connections for shifting the dog and extending the movement of the gages after a predetermined number of movements of the cutters, substantially as set forth.

17. The combination of the cutters, frame G, gage-rods carried thereby, rock-shaft having arms connected with said rods, an arm extending from said shaft and carrying a dog, a stop arranged to make contact with the dog, and a control device and connections for shifting the dog after a predetermined number of actions of the cutters, substantially as set forth.

18. The combination with the cutters, frame G, rock-shaft and gage-rods, of an arm on the frame, a dog carried thereby, a stop arranged to normally engage the dog, a control device having a wheel 60, and stops whereby the gage-rods are at intervals set closer to the sheet, substantially as set forth.

19. The combination with the cutters, frame G, rock-shaft and gage-rods, of an arm on the frame, a dog carried thereby, a stop arranged to normally engage the dog, a control device having a wheel 60, stops whereby the gage-rods are at intervals set nearer the sheet, and a rod 65 and connections whereby the wheel 60 is turned step by step, substantially as set forth.

20. The combination with the cutters, frame G, rock-shaft and gage-rods, of an arm on the frame, a dog carried thereby, a stop arranged to normally engage the dog, a control device having a ratchet-wheel 60, stops whereby the gage-rods are at intervals set closer to the sheet, a lever carrying a pawl engaging the ratchet, and a rod 65 connected to said lever and extending forward to be struck by the sheet to be cut, substantially as set forth.

21. The combination of the cutters, frame G, shaft H, and gage-rods connected with said shaft, arm 50, a dog and bell-crank, a stop 53, a ratchet-wheel 60, means for turning it step by step, and a stop 76 in the wheel adapted to engage the said bell-crank, substantially as set forth.

22. The combination of the cutters, frame G, shaft H and gage-rods connected with said shaft, arm 50, a dog and bell-crank, stops 53 and 81, a ratchet-wheel 60, means for turning it step by step, a stop 76 on the wheel adapted to engage the said bell-crank, and connected pawls 61, 63, and an arm 80 connected with the pawl 61 and adapted to engage the stop 81, substantially as set forth.

23. The combination of the cutters, frame G, shaft H, and gage-rods connected with said shaft, arm 50, a dog and bell-crank, a stop 53, a ratchet-wheel 60, means for turning it step by step, a weight for carrying it in a reverse direction, and a stop 76 on the wheel adapted to engage the said bell-crank, substantially as set forth.

24. The combination with the cutters of a machine for making expanded metal, of gages for determining the normal feed of the sheet, means for setting the same mechanically to reduce the normal feed of the sheet when the latter is to be divided, a feed device, a lever for operating the same, and yielding connections between the lever and the feed device, substantially as set forth.

25. In a machine for making expanded metal, the combination of the reciprocating cutter-head, its two sets of cutters in different positions, a stationary cutter, a drop-bar and cutter carried thereby, and means whereby to lift and lower the drop-bar and whereby to vary the time of dropping the bar, substantially as set forth.

In testimony whereof I have signed my name to this specification in the presence of two subscribing witnesses.

GEO. G. McKAY.

Witnesses:
   GEORGE HIGGINS,
   J. M. FINK.